US012664990B2

(12) United States Patent
Xiong et al.

(10) Patent No.: US 12,664,990 B2
(45) Date of Patent: Jun. 23, 2026

(54) AUDIO PROCESSING OF MISSING AUDIO INFORMATION

(71) Applicant: Tencent Technology (Shenzhen) Company Limited, Shenzhen (CN)

(72) Inventors: Wei Xiong, Shenzhen (CN); Fei Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 221 days.

(21) Appl. No.: 18/207,554

(22) Filed: Jun. 8, 2023

(65) Prior Publication Data

US 2023/0326468 A1 Oct. 12, 2023

Related U.S. Application Data

(63) Continuation of application No. PCT/CN2022/113277, filed on Aug. 18, 2022.

(30) Foreign Application Priority Data

Oct. 9, 2021 (CN) .......................... 202111176990.0

(51) Int. Cl.
*G10L 19/005* (2013.01)
*G10L 19/06* (2013.01)
*G10L 21/0316* (2013.01)

(52) U.S. Cl.
CPC ............ *G10L 19/005* (2013.01); *G10L 19/06* (2013.01); *G10L 21/0316* (2013.01)

(58) Field of Classification Search
None
See application file for complete search history.

(56) References Cited

U.S. PATENT DOCUMENTS 8,165,128 B2 * 4/2012 Sun ......................... G10L 21/04 714/776
2019/0051310 A1 * 2/2019 Chang ..................... G10L 25/30
(Continued)

FOREIGN PATENT DOCUMENTS

CN 111653285 A 9/2020
CN 113035207 A 6/2021
(Continued)

OTHER PUBLICATIONS

Wang, Kunfeng, et al. "Generative adversarial networks: introduction and outlook." IEEE/CAA Journal of Automatica Sinica 4.4 (2017): 588-598. (Year: 2017).*
(Continued)

*Primary Examiner* — Douglas Godbold
(74) *Attorney, Agent, or Firm* — ArentFox Schiff LLP

(57) ABSTRACT

Target audio data and frequency spectrum information of the target audio data is acquired. The target audio data includes an audio missing segment and context audio segments of the audio missing segment. The frequency spectrum information includes frequency spectrum features of the context audio segments. Feature compensation is performed on the frequency spectrum information of the target audio data based on the frequency spectrum features of the context audio segments to obtain compensated frequency spectrum information corresponding to the target audio data. The compensated frequency spectrum information indicates upsampled frequency spectrum information of the target audio data. Audio prediction is performed based on the compensated frequency spectrum information to obtain predicted audio data. The audio missing segment in the target audio data is compensated by replacing the audio missing segment with a predicted segment in the predicted audio
(Continued)

data to obtain compensated audio data of the target audio data.

20 Claims, 9 Drawing Sheets

(56) References Cited

U.S. PATENT DOCUMENTS

| | | | | |
|---|---|---|---|---|
| 2023/0377584 A1* | 11/2023 | Pascual | .................. | G06N 3/094 |
| 2024/0055006 A1* | 2/2024 | Biswas | ................... | G10L 25/30 |

FOREIGN PATENT DOCUMENTS

| | | |
|---|---|---|
| CN | 113096685 A | 7/2021 |
| CN | 113612808 A | 11/2021 |

OTHER PUBLICATIONS

Shi, Yupeng, et al. "Speech loss compensation by generative adversarial networks." 2019 Asia-Pacific Signal and Information Processing Association Annual Summit and Conference (APSIPA ASC). IEEE, 2019. (Year: 2019).*

Marafioti, Andres, et al. "GACELA: A generative adversarial context encoder for long audio inpainting of music." IEEE Journal of Selected Topics in Signal Processing 15.1 (2020): 120-131. (Year: 2020).*

International Search Report and Written Opinion issued Nov. 17, 2022 in Application No. PCT/CN2022/113277, pp. 1-16.

Extended European Search Report received for European Patent Application No. 22877807.2, mailed on Sep. 10, 2024, 10 pages.

Lee Sun-Kyung., "Deep Generative Music Inpainting with Mel-Spectrogram", Doctoral dissertation, Ph.D. Thesis, KAIST, Jan. 1, 2020, 3 pages.

Marafioti et al., "A Context Encoder For Audio Inpainting", IEEE/ACM Transactions on Audio, Speech, and Language Processing, vol. 27, No. 12, Dec. 1, 2019, 11 pages.

* cited by examiner

AUDIO PROCESSING OF MISSING AUDIO INFORMATION

RELATED APPLICATIONS

The present application is a continuation of International Application No. PCT/CN2022/113277, entitled "AUDIO PROCESSING METHOD, RELATED DEVICE, STORAGE MEDIUM, AND PROGRAM PRODUCT" and filed on Aug. 18, 2022, which claims priority to Chinese Patent Application No. 202111176990.0, entitled "AUDIO PROCESSING METHOD, RELATED DEVICE, STORAGE MEDIUM, AND PROGRAM PRODUCT" filed on Oct. 9, 2021. The entire disclosures of the prior applications are hereby incorporated by reference in their entirety.

FIELD OF THE TECHNOLOGY

This application relates to the field of computer technologies, including audio processing.

BACKGROUND OF THE DISCLOSURE

With the continuous development of computer network technologies, packet loss usually occurs during transmission of audio data over the Internet, and partial audio data of transmitted audio cannot be received by a receiving end, which affects the listening experience of users.

In the related technology, an autoregressive iterative prediction method, that is, a method of sequentially predicting a succeeding sampling point on the basis of a preceding sampling point, is commonly adopted for compensation and recovery for lost audio packets.

An error is continuously accumulated during iterative prediction. Therefore, how to improve the accuracy of audio data obtained by prediction and compensation for lost audio packets becomes a current research hot spot.

SUMMARY

Embodiments of the present disclosure provide an audio processing method, a related device, a non-transitory computer-readable storage medium, and a program product, which may improve the accuracy of prediction and compensation for lost audio packets.

In an aspect of the disclosure, a method of audio processing is provided. In the method, target audio data and frequency spectrum information of the target audio data is acquired. The target audio data includes an audio missing segment and context audio segments of the audio missing segment. The frequency spectrum information includes frequency spectrum features of the context audio segments. Feature compensation is performed on the frequency spectrum information of the target audio data based on the frequency spectrum features of the context audio segments to obtain compensated frequency spectrum information corresponding to the target audio data. The compensated frequency spectrum information indicates upsampled frequency spectrum information of the target audio data. Audio prediction is performed based on the compensated frequency spectrum information to obtain predicted audio data. The audio missing segment in the target audio data is compensated by replacing the audio missing segment with a predicted segment in the predicted audio data to obtain compensated audio data of the target audio data.

According to another aspect of the disclosure, an apparatus is provided. The apparatus includes processing circuitry. The processing circuitry can be configured to perform any of the described methods of audio processing.

Aspects of the disclosure also provide a non-transitory computer-readable medium storing instructions which when executed by a computer for video decoding cause the computer to perform any of the described methods of audio processing.

In the embodiments of this disclosure, after acquiring target audio data with an audio missing segment, a computer device may acquire frequency spectrum information of the target audio data, perform feature compensation on the frequency spectrum information based on a frequency spectrum feature of a context audio segment of the audio missing segment that is included in the frequency spectrum information to obtain compensated frequency spectrum information of the target audio data, and recognize the compensated frequency spectrum information to obtain more frequency spectrum information of the target audio data. In addition, after obtaining the compensated frequency spectrum information, the computer device may perform audio prediction according to the compensated frequency spectrum information to obtain predicted audio data, and compensate for the audio missing segment in the target audio data according to the predicted audio data and the target audio data to obtain compensated audio data of the target audio data. The computer device predicts and compensates for the audio missing segment according to frequency spectrum information of the overall context audio segment, so that the computer device may predict and compensate for the audio missing segment based on all frequency spectrum information of the target audio data, and the accuracy and rationality of prediction and compensation performed by the computer device on the audio missing segment may be improved.

DESCRIPTION OF EMBODIMENTS

Figure 1A:
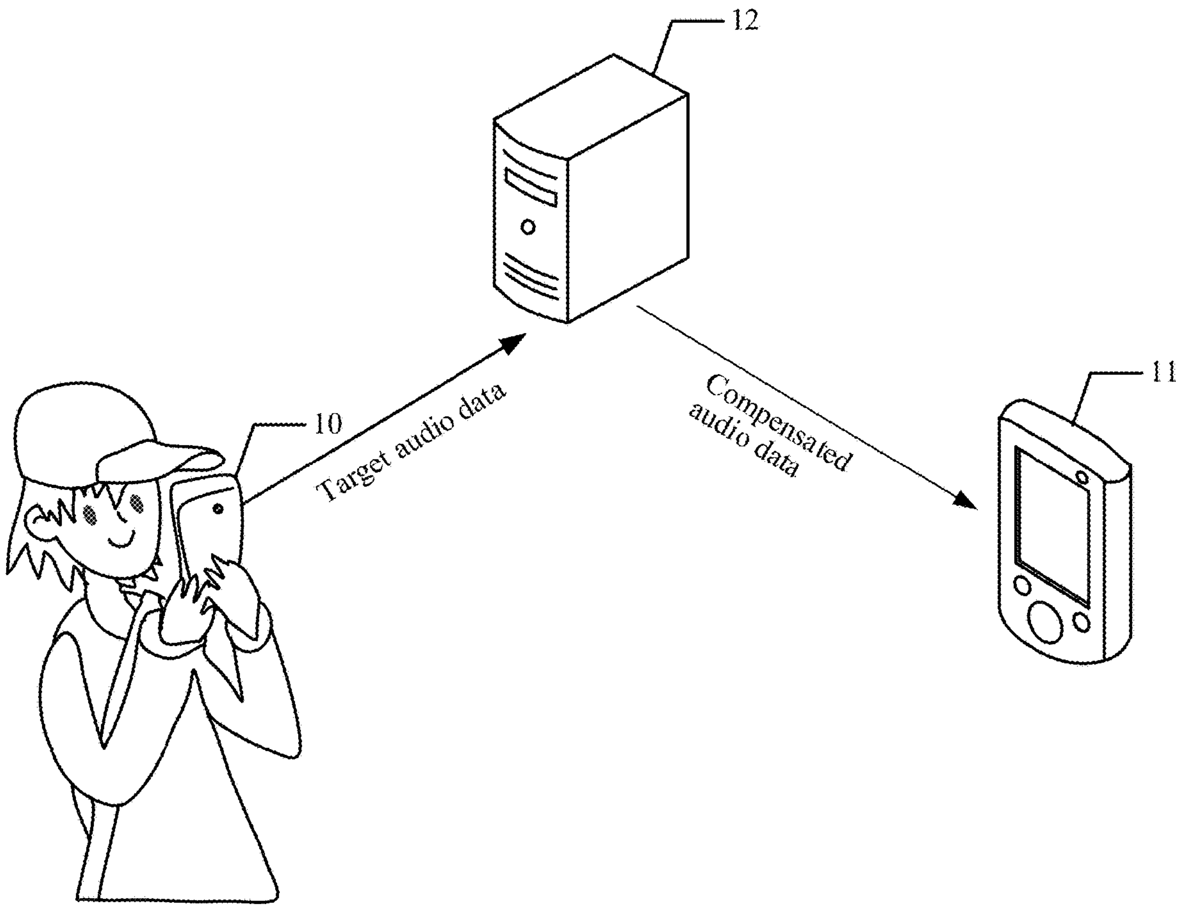
FIG. 1A is a schematic diagram of a scene of audio processing according to an embodiment of the present disclosure.

The embodiments of this disclosure provide an audio processing method. According to the method, after acquiring target audio data with an audio missing segment, a computer device may predict and compensate for the audio missing segment according to a context audio segment of the audio missing segment in the target audio data. The computer device predicts the audio missing segment in the target audio data with reference to the context audio segment of the audio missing segment in the target audio data, so that the computer device may make full use of effective information of the target audio data during prediction of the audio missing segment, and the robustness of prediction and compensation performed by the computer device on the audio missing segment may be improved. In an embodiment, the target audio data may be call voice data, music data, an audio part in video data, or the like. The call voice data may be historical data acquired from an instant messaging application program, or may also be data generated in real time during a voice call. The voice call may be realized based on a mobile communication network (such as a second-generation mobile communication network), or may also be voice over Internet Protocol (VoIP) realized based on the Internet Protocol (IP). That is, the call voice data may be collected by a mobile device in a mobile communication network, or may also be intercepted from the Internet. In addition, the audio missing segment in the target audio data refers to a segment without audio data (or with 0 piece of audio data), the context audio segment of the audio missing segment includes a preceding audio segment and a succeeding audio segment of the audio missing segment, the preceding audio segment refers to an audio segment of which corresponding playback time is earlier than that of the audio missing segment in the target audio data, and the succeeding audio segment refers to an audio segment of which corresponding playback time is later than that of the audio missing segment in the target audio data.

During transmission of audio data (such as the foregoing target audio data) over network, a media engine cannot ensure that each audio stream data packet can be received. Therefore, in a case that a data packet (that is, a data segment in the target audio data) is lost during transmission, an audio receiving end cannot acquire complete audio data, which affects the playback experience of a user at the receiving end for the target audio data. In a case that the target audio data is call voice data, and a partial audio segment in the call voice data cannot be successfully received by the receiving end due to network transmission problems, the user at the receiving end will experience freezing during a voice call, which affects the audio quality and user's call experience during the call. To avoid impact on the listening effect of the user at the receiving end due to the loss of audio data during transmission, packet loss concealment (PLC) may be performed based on a context audio segment of a lost audio segment to improve the listening experience (or call experience) of the user at the receiving end. In an embodiment, when predicting and compensating for the audio missing segment according to the context audio segment of the audio missing segment in the target audio data, to make full use of audio recorded in the target audio data, the computer device may recognize and predict the context audio segment based on a non-autoregressive algorithm model, and compensate for and recover the audio missing segment according to a recognition and prediction result of the context audio segment.

In an embodiment, the non-autoregressive algorithm model is a non-recursive recognition process in which sequence markers are generated in parallel in a time sequence model without waiting for generation of a previous time marker. That is, the non-autoregressive algorithm model breaks a serial order in the recognition and prediction of the context audio segment, and may recognize the overall context audio segment to obtain a prediction result of the audio missing segment. In an embodiment, the non-autoregressive algorithm model may be a deep learning-based network model. For example, the computer device may adopt an end-to-end non-autoregressive model to compensate for and recover the audio missing segment in the target audio data according to the context audio segment in the target audio data. In an implementation, when adopting the non-autoregressive algorithm model to recognize and predict the context audio segment of the audio missing segment, the computer device may transform the context audio segment from the time domain to the frequency domain, and compensate for the audio missing segment in the target audio data by recognizing frequency spectrum information corresponding to the context audio segment in the frequency domain. The time domain and the frequency domain are basic information of signals (including voice signals and audio signals), and are used for signal analysis of signals from different dimensions. Different perspectives used for cut-in analysis of signals may be referred to as domains. The time domain may reflect a corresponding relationship between a mathematical function or physical signal and time, is the feedback of the real world, and is an objectively existing domain in the real world. The frequency domain is a coordinate system used for describing characteristics of a signal in the frequency domain, is a method that is constructed from a mathematical perspective as an aid to thinking, and does not exist objectively. When analyzing a frequency spectrum of the context audio segment, the computer device may input a frequency spectrum feature of the context audio segment into a generator, and perform prediction based on the frequency spectrum feature of the context audio segment through the generator to obtain predicted audio data. Because the predicted audio data is audio data without an audio missing segment, the computer device may perform data fusion on the predicted audio data and the original target audio data with the audio missing segment after obtaining the predicted audio data to obtain final audio data that will be played at the receiving end.

Figure 1B:
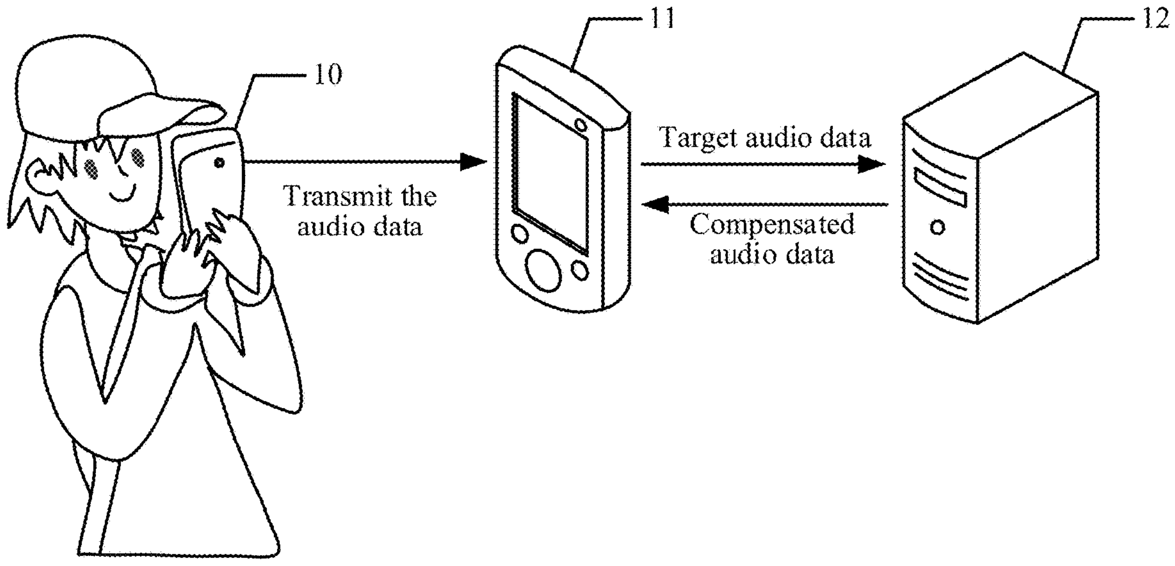
FIG. 1B is a schematic diagram of a scene of another audio processing according to an embodiment of the present disclosure.

In an embodiment, the computer device may be deployed between a transmission end and a receiving end of the target audio data. As shown in FIG. 1A, a device corresponding to the transmission end may be a device marked by 10 in FIG. 1A, a device corresponding to the receiving end may be a device marked by 11 in FIG. 1A, and the computer device may be a device deployed between the device 10 corresponding to the transmission end and the device 11 corresponding to the receiving end, and is marked by 12 in FIG. 1A. That is, the computer device 12 may intercept audio data when the device 10 corresponding to the transmission end transmits the audio data to the device 11 corresponding to the receiving end, take the intercepted audio data as target audio data in case that it is detected that the intercepted audio data has an audio missing segment, compensate for the audio missing segment according to a frequency spectrum feature of context audio data of the audio missing segment in the target audio data to obtain compensated audio data of the target audio data after the target audio data is compensated and recovered, and transmit the compensated audio data to the device 11 corresponding to the receiving end. In another implementation, after the device 10 corresponding to the transmission end transmits audio data to the device 11 corresponding to the receiving end, the device 11 corresponding to the receiving end may take the audio with a missing segment as target audio data in a case that the device 11 corresponding to the receiving end detects the missing of a partial audio segment in the audio data acquired from the device 10 corresponding to the transmission end, and transmit the target audio data to the computer device 12. As shown in FIG. 1B, after predicting and compensating for the audio missing segment in the target audio data, the computer device 12 may feed back compensated audio data to the device 11 corresponding to the receiving end. In an embodiment, the computer device may be a terminal device, or may also be a server, which is not defined herein. Moreover, the computer device may also be a module integrated into the device corresponding to the receiving end or the device corresponding to the transmission end. In addition, the computer device may include, but is not limited to, a mobile phone, a computer, an intelligent voice interaction device, an intelligent household electrical appliance, an on-board terminal, and the like.

Figure 2:
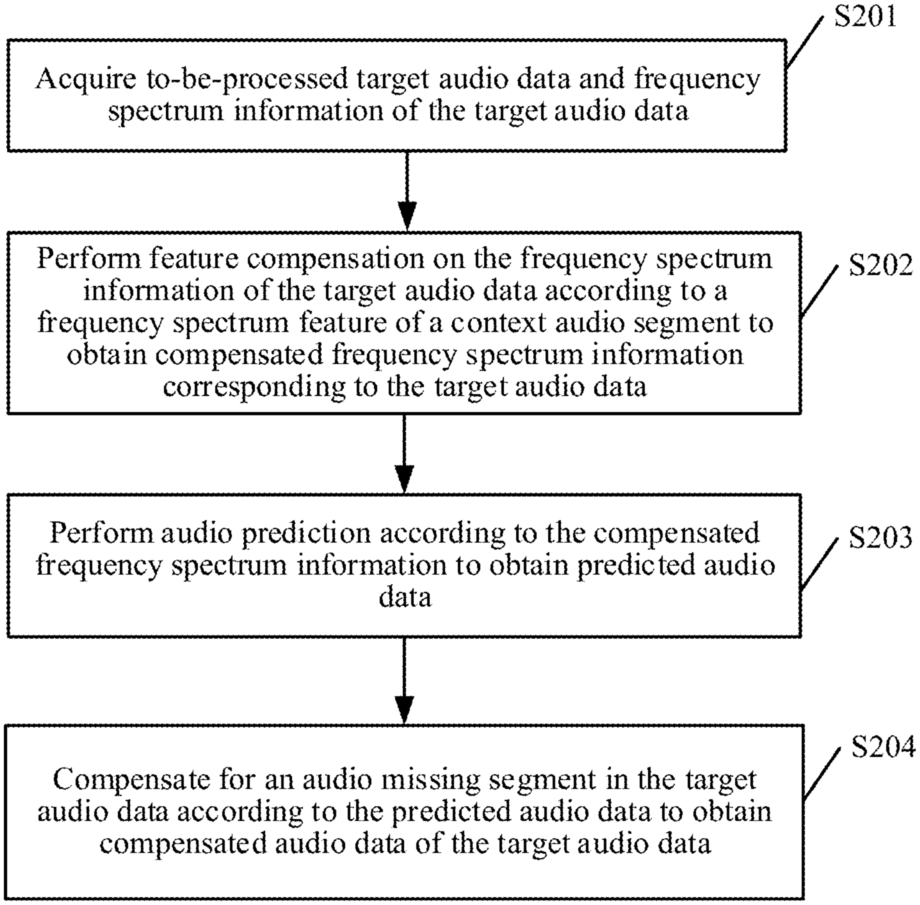
FIG. 2 is a schematic flowchart of an audio processing method according to an embodiment of the present disclosure.

Referring to FIG. 2, FIG. 2 is a schematic flowchart of an audio processing method according to an embodiment of this disclosure. As shown in FIG. 2, the method may include the steps as follows.

In step S201, to-be-processed target audio data and frequency spectrum information of the target audio data is acquired.

In an embodiment, the target audio data refers to any audio data with an audio missing segment. The audio data may be music data, voice data, an audio content in video data, or the like. In the embodiments of this disclosure, the audio data mainly refers to voice data that may be voice data generated in real time during a call or may also be historical voice data, and the voice data may include call voice, or may also include a voice message and the like in a social application program. When a computer device requires a lot of computing resources for time domain data processing after acquiring the to-be-processed target audio data that is time domain data, that is, in a case that the computer device determines that a lot of computing resources are required for direct processing of the target audio data, the computer device may acquire frequency spectrum information of the target audio data, and map the frequency domain processing of the frequency spectrum information of the target audio data to the time domain analysis of the target audio data, so that the computer device may analyze the target audio data with a few of computing resources, and computing resources of the computer device may be effectively saved.

The target audio data acquired by the computer device has the audio missing segment, and the audio missing segment is represented as 0 in the time domain, that is, a partial frequency band of the target audio data is represented as 0 in the time domain. After the target audio data is mapped from the time domain to the frequency domain to obtain frequency spectrum information of the target audio data, a frequency spectrum, corresponding to the audio missing segment, in the frequency spectrum information of the target audio data is generally represented as 0. The computer device may adopt the short-time Fourier transform, or may also adopt the Mel-spectrum analysis (a time-to-frequency domain transformation method), or may also adopt a method of combining the short-time Fourier transform and the Mel-spectrum analysis to map the target audio data from the time domain to the frequency domain. The computer device may invoke a frequency domain processing module in the computer device to map the target audio data to the frequency domain. The frequency domain processing module may map the target audio data to the frequency domain according to an acquired sampling rate, an audio length (or an audio extraction length), a Fourier transform window length, and a Fourier transform window interval to obtain frequency spectrum information of the target audio data. The acquired sampling rate may be 16 k, the audio length may be 512 milliseconds (ms), the Fourier transform window length may be 1024, and the Fourier transform window interval may be 256. The sampling rate of 16 k refers to that 1 ms corresponds to 16 sampling points, so the audio length of 512 ms corresponds to 8192 sampling points. After obtaining the 8192 sampling points corresponding to the target audio data in the time domain, the computer device may map the obtained sampling points to the frequency domain to obtain frequency spectrum information of the target audio data.

Based on the audio missing segment in the target audio data, an audio segment, having a time domain representation and corresponding playback time earlier than that of the audio missing segment, in the target audio data may be referred to as a preceding audio segment in the target audio data, and an audio segment, having a time domain representation and corresponding playback time later than that of the audio missing segment, in the target audio data may be referred to as a succeeding audio segment in the target audio data. The preceding audio segment and the succeeding audio segment may be collectively referred to as a context audio segment in the target audio data.

The frequency spectrum information of the target audio data includes a frequency spectrum feature of the context audio segment of the audio missing segment, that is, a frequency spectrum feature of the preceding audio segment and a frequency spectrum feature of the succeeding audio segment of the audio missing segment. The computer device may perform feature compensation on the frequency spectrum information of the target audio data based on the frequency spectrum feature of the context audio segment, that is, perform S202.

In step S202, feature compensation can be performed on the frequency spectrum information of the target audio data according to the frequency spectrum feature of the context audio segment to obtain compensated frequency spectrum information corresponding to the target audio data.

The feature compensation performed by the computer device on the frequency spectrum information of the target audio data based on the frequency spectrum feature of the context audio segment includes at least upsampling. In an embodiment, the computer device may perform upsampling on the frequency spectrum information of the target audio data by bilinear interpolation or nearest-neighbor interpolation. After upsampling of the frequency spectrum information of the target audio data is completed, the computer device may add more feature information to the frequency spectrum information, so that when predicting and compensating for the audio missing segment in the target audio data subsequently, the computer device may acquire more frequency spectrum features from the frequency spectrum information subjected to upsampling to improve the accuracy of prediction and compensation performed by the computer device on the audio missing segment. In addition, the feature compensation performed by the computer device on the frequency spectrum information of the target audio data may further include convolution performed on the frequency spectrum information of the target audio data based on the context audio segment. By performing convolution on the frequency spectrum information, the computer device may perceive more context information during feature compensation of the target audio data to expand a feature receptive field. Based on the expanded feature receptive field, the computer device may add various frequency spectrum features corresponding to different scales to the frequency spectrum information of the target audio data when performing feature compensation on the frequency spectrum information of the target audio data, so that the richness and rationality of features in compensated frequency spectrum information that is obtained by the computer device by performing feature compensation on the frequency spectrum information of the target audio data may be effectively improved.

In an embodiment, the computer device may perform upsampling once or multiple times during feature compensation of the frequency spectrum information of the target audio data. After performing upsampling each time, the computer device may perform convolution once, that is, the computer device performs feature compensation on the frequency spectrum information of the target audio data by alternately performing upsampling and convolution. Because the computer device performs further sampling on the sampling points of the target audio data when acquiring the frequency spectrum information of the target audio data, when performing feature compensation on the frequency spectrum information of the target audio data, the computer device may perform feature restoration by upsampling based on the sampling points in the frequency spectrum information. That is, when performing feature restoration on the frequency spectrum information of the target audio data, the computer device performs feature compensation according to the number of sampling points included in the frequency spectrum information and the number of sampling points for sampling the target audio data in the time domain, so that the number of sampling points in compensated frequency spectrum information obtained by the computer device by performing feature compensation on the frequency spectrum information is consistent with the number of sampling points corresponding to the target audio data in the time domain, and the rationality of feature compensation performed by the computer device on the frequency spectrum information of the target audio data may be ensured.

Figure 3A:
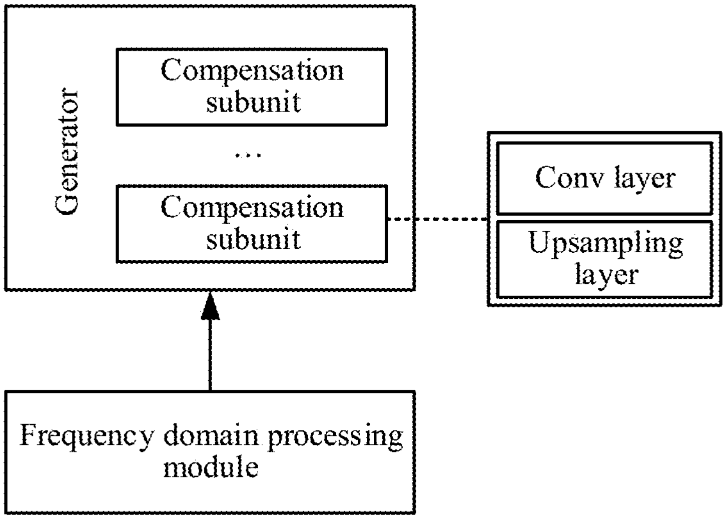
FIG. 3A is a schematic diagram of a connection between a frequency domain processing module and a generator according to an embodiment of the present disclosure.

In an embodiment, the computer device may invoke a generator in the computer device to perform feature compensation on the frequency spectrum information of the target audio data. The generator is connected to the foregoing frequency domain processing module configured to obtain the frequency spectrum information of the target audio data, that is, an output of the foregoing frequency domain processing module is an input of the generator. As shown in FIG. 3A, the generator includes one or more compensation subunits of different scales, and each compensation subunit includes a cony layer and an upsampling layer. When invoking the generator to perform feature compensation on the frequency spectrum information of the target audio data, the computer device inputs the frequency spectrum information of the target audio data into the generator, and invokes the one or more compensation subunits of different scales in the generator to perform iteration on the frequency spectrum information. Upsampling frequencies in different compensation subunits in the generator may be the same or different, and convolution depths and scales of the cony layers in different compensation subunits may also be the same or different. After obtaining the compensated frequency spectrum information corresponding to the target audio data, the computer device may predict and compensate for the audio missing segment in the target audio data based on the compensated frequency spectrum information, that is, perform S203.

In step S203, audio prediction can be performed based on the compensated frequency spectrum information to obtain predicted audio data.

In step S204, the audio missing segment in the target audio data can be compensated based on the predicted audio data to obtain compensated audio data of the target audio data.

Figure 3B:
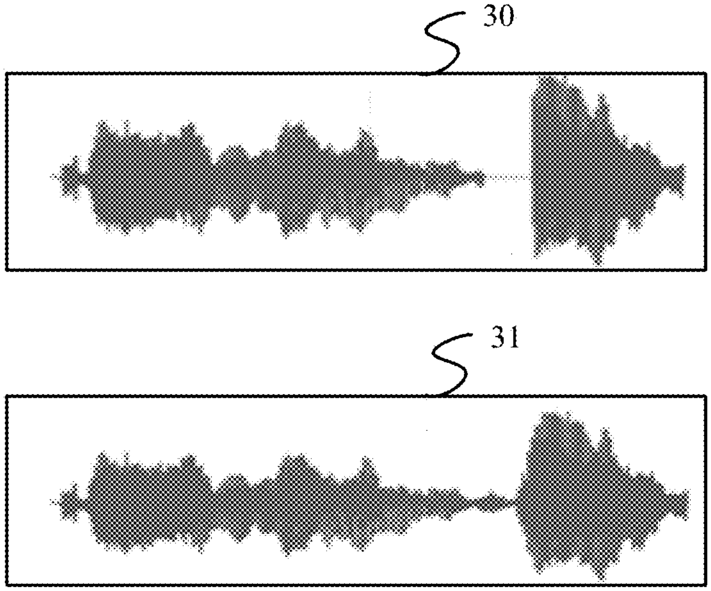
FIG. 3B is a schematic diagram of target audio data and predicted audio data according to an embodiment of the present disclosure.

In some embodiments, after the compensated frequency spectrum information of the target audio data is obtained, the computer device may first perform audio prediction according to the compensated frequency spectrum information to obtain predicted audio data. In an embodiment, when performing audio prediction according to the compensated frequency spectrum information, the computer device performs audio prediction based on all frequency spectrum features in the compensated frequency spectrum information, that is, the computer device performs prediction based on the compensated frequency spectrum information to obtain predicted data of all frequency bands in the target audio data. As shown in FIG. 3B, in a case that the target audio data with the audio missing segment that is acquired by the computer device is audio data marked by 30 in FIG. 3B, the computer device recognizes the target audio data to obtain compensated frequency spectrum information of the target audio data, and obtains predicted audio data, which is audio data marked by 31 in FIG. 3B, according to the compensated frequency spectrum information. It can be seen from the predicated audio data obtained by the computer device that when predicting and compensating for the audio missing segment in the target audio data, the computer device first obtains predicted audio data corresponding to the target audio data, and then compensates for the audio missing segment in the target audio data based on the target audio data and the predicted audio data to obtain compensated audio data of the target audio data.

In an embodiment, the computer device compensates for the audio missing segment in the target audio data according to the target audio data and the predicted audio data, and a corresponding waveform and a data distribution of the predicted audio data obtained by the computer device by performing prediction according to the compensated frequency spectrum information are not consistent with those of the original target audio data. Therefore, when performing compensation and recovery according to the target audio data and the predicted audio data, the computer device may first determine a predicted missing segment (or predicted segment) corresponding to the audio missing segment in the target audio data from the predicted audio data, and then replace the audio missing segment in the target audio data with the predicted missing segment (or predicted segment) to obtain compensated audio data of the target audio data. In another implementation, after obtaining the predicted audio data corresponding to the target audio data, the computer device may first determine a previous audio segment and a next audio segment of the audio missing segment from the target audio data and the predicted audio data. A segment end of the previous audio segment and a segment start of the audio missing segment are the same audio point, and a segment start of the next audio segment and a segment end of the audio missing segment are the same audio point. The computer device may further perform transition fusion according to the determined audio segments, and then generate compensated audio data according to an audio segment obtained by transition fusion, so that the computer device may smoothly integrate the audio missing segment into the compensated audio data, the compensated audio data has characteristics of smooth transition, and the smoothness of playback of the compensated audio data when played by the receiving end device may also be improved.

In an embodiment, the computer device performs transition fusion according to the determined audio segments in a fade-in and fade-out way. The fade-in and fade-out fusion method is a linear superposition method, that is, a method for linearly superimposing the target audio data and the compensated audio data. To improve the smoothness of superposition of the target audio data and the compensated audio data, the computer device may adjust the previous audio segment and the next audio segment of the audio missing segment when compensating for the audio missing segment in the target audio data, so that an audio missing segment in the compensated audio data is smoothly transitioned, and the playback effect of the compensated audio data obtained by fusion is improved. In addition, when obtaining compensated audio data of the target audio data according to the target audio data and the predicted audio data, the computer device may fuse audio data obtained by transition fusion and the target audio data, or may also fuse the audio data obtained by transition fusion and the predicted audio data to obtain compensated audio data of the target audio data. The compensated audio data refers to data without an audio missing segment.

In the embodiments of this disclosure, after acquiring target audio data with an audio missing segment, a computer device may acquire frequency spectrum information of the target audio data, perform feature compensation on the frequency spectrum information based on a frequency spectrum feature of a context audio segment of the audio missing segment that is included in the frequency spectrum information to obtain compensated frequency spectrum information of the target audio data, and recognize the compensated frequency spectrum information to obtain more frequency spectrum information of the target audio data. In addition, after obtaining the compensated frequency spectrum information, the computer device may perform audio prediction according to the compensated frequency spectrum information to obtain predicted audio data, and compensate for the audio missing segment in the target audio data according to the predicted audio data and the target audio data to obtain compensated audio data of the target audio data. The computer device predicts and compensates for the audio missing segment according to frequency spectrum information of the overall context audio segment, so that the computer device may predict and compensate for the audio missing segment based on all frequency spectrum information of the target audio data, and the accuracy and rationality of prediction and compensation performed by the computer device on the audio missing segment may be improved.

Figure 4:
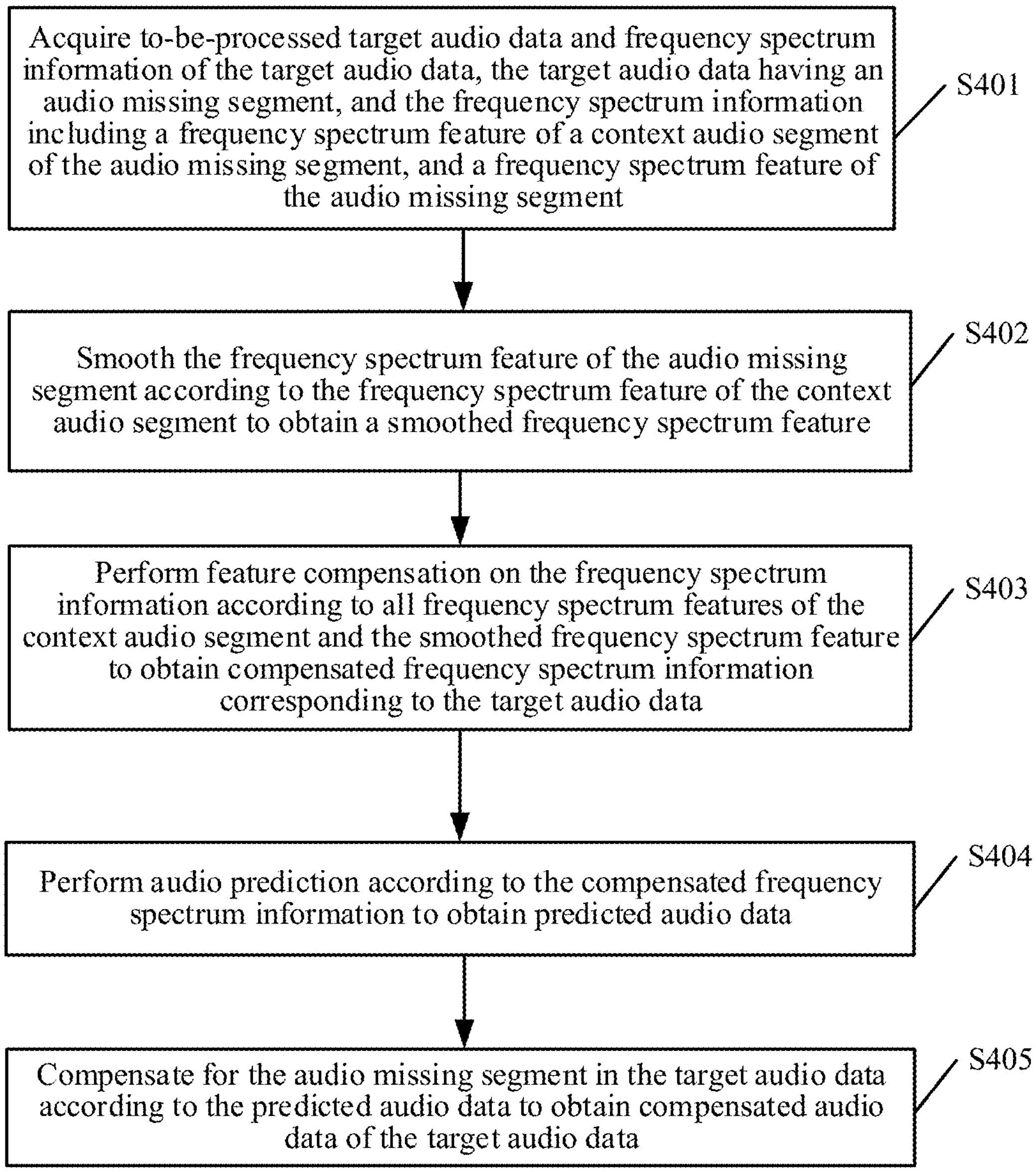
FIG. 4 is a schematic flowchart of another audio processing method according to an embodiment of the present disclosure.

Referring to FIG. 4, FIG. 4 is a schematic flowchart of an audio processing method according to an embodiment of this disclosure. As shown in FIG. 4, the method may include the following steps.

In step S401, to-be-processed target audio data and frequency spectrum information of the target audio data is acquired. The target audio data includes an audio missing segment, and the frequency spectrum information includes a frequency spectrum feature of a context audio segment of the audio missing segment and a frequency spectrum feature of the audio missing segment.

The to-be-processed target audio data acquired by a computer device may be audio data with an audio missing segment that is actually acquired by the computer device, or may also be sample data that is extracted from training audio data. After acquiring the target audio data, the computer device may recognize the frequency spectrum information of the target audio data to obtain predicted audio data, perform audio prediction based on all available frequency spectra of the target audio data, and further predict and compensate for the audio missing segment in the target audio data based on the predicted audio data and the target audio data. After acquiring the target audio data, the computer device invokes a generator to recognize the frequency spectrum information of the target audio data so as to obtain predicted audio data. Thus, the computer device may train the generator by acquiring sample data.

In an implementation, the computer device may train the generator (or the generator and a discriminator) with reference to a discrimination result of output data of the generator that is obtained through a discriminator. Both the generator and the discriminator are deep learning-based network structures. The generator and the discriminator may be designed together based on a model structure of a generative adversarial network (GAN) model, or the generator and the discriminator may be respectively designed based on a deep learning-based generator model and discrimination model. In an embodiment, in a case that the generator and the discriminator are designed based on the model structure of the generative adversarial network, a process of training the generator by the computer device is a process of training the discriminator. That is, in this case, the computer device needs to perform adversarial training on both the generator and the discriminator to finally obtain trained network models. When the generator and the discriminator are designed based on the model structure of the generative adversarial network, a convolutional neural network (CNN) is mainly used for the generator. In a case that the generator and the discriminator are respectively designed, the computer device may train the generator and the discriminator, respectively, to optimize the generator and the discriminator, respectively.

In an embodiment, when the generator is designed, a sampling rate and an audio extraction length are specified. In a case that the target audio data is data extracted by the generator from the training audio data, when acquiring the to-be-processed target audio data, the computer device may first invoke the generator to extract intermediate audio data with a length equal to the audio extraction length from the training audio data according to the audio extraction length. Then, the computer device may invoke the generator to sample the intermediate audio data according to a target sampling rate so as to obtain a sampling sequence of the intermediate audio data, perform simulative packet loss adjustment on a plurality of sampling points in the sampling sequence according to a preset packet loss length to obtain target audio data. The simulative packet loss adjustment is an adjustment method for simulating packet loss by adjusting sampling points. For example, the plurality of sampling points may be adjusted to 0, and the sampling points adjusted to 0 are taken as the audio missing segment in the target audio data. The training audio data includes audio data in one or more languages, such as Chinese, English, and German. Moreover, the training audio data may be audio data of one person, or may also be audio data of many persons. An audio length of the acquired training audio data exceeds 500 hours. In an embodiment, some or all audio processing parameters that are specified in the generator may be as shown in Table 1.

TABLE 1

Audio processing parameters specified in a generator

| Parameter name | Parameter value | Parameter name | Parameter value |
|---|---|---|---|
| Sampling rate | 16k | Generator amplification | [8, 8, 2, 2] |
| Audio extraction length | 512 ms | Convolution kernel size | 3 |
| Fourier transform window length | 1024 | Single audio packet length | 10 ms |
| Fourier transform window interval | 256 | Random number of lost packets | 1-12 |
| Batch_size | 32 | Lengths before and after fusion | 20 ms |

Batch_size refers to the size of each batch of data, that is, the number of samples that are trained together each time. By training samples in batches, an average loss function value of the samples may be calculated, and parameters of the network model may be updated. Batch_size generally takes the value of 32.

In a case that the generator directly processes the training audio data, a lot of computing resources in the computer device will be consumed based on the audio length of the training audio data. Therefore, the generator may extract intermediate audio data from the training audio data based on a set audio extraction length (which is assumed to be 512 ms), and sample the intermediate audio data based on a target sampling rate (which is assumed to be 16 k) to obtain a sampling sequence of the intermediate audio data. In this case, the obtained sampling sequence of the intermediate audio data includes 8192 sampling points. Further, the computer device may randomly set K pieces of audio data in the 8192 sampling points as 0 to simulate audio missing segments in the target audio data. A length of each piece of audio data is the preset packet loss length that is set in the generator, which may be assumed to be 10-120 ms. K is a positive integer less than or equal to 3. In another implementation, the generator may further randomly discard the 8192 sampling points in the sampling sequence of the intermediate audio data based on the set number (which is assumed to be 1-12) of packet loss segments, so that the to-be-processed target audio data acquired by the computer device is audio data including an audio missing segment.

In an embodiment, the audio missing segment included in the target audio data that is acquired by the computer device may also become packet loss data or a mask audio segment. When training the generator, the computer device takes audio data without packet loss as original audio data, and continuously trains model parameters of the generator, so that the generator performs prediction according to the context information in the frequency spectrum information of the target audio data to obtain predicted audio data whose similarity with the original audio data satisfies a threshold value, and predicts and compensates for the mask audio segment.

In addition, in a case that the computer device directly invokes the generator to process the sampling sequence of the target audio data after acquiring the 8192 sampling points of the target audio data, the computer device will consume a lot of time due to the excessive input of the network. Therefore, after obtaining the sampling sequence of the target audio data, the computer device may first perform digital signal processing on the target audio data to transform the target audio data from the time domain to the frequency domain so as to obtain frequency spectrum information of the target audio data. The computer device may transform the target audio data from the time domain to the frequency domain with reference to the parameters in Table 1. The computer device may transform the 8192 sampling points into a 32*80 frequency spectrogram (that is, the frequency spectrum information) by frequency domain transformation. In this case, features of the frequency spectrum information that are recognized by the computer device by invoking the generator include [N, 32, 80], 80 refers to the preset number of channels, N refers to the number of a batch of iterations that are inputted into the generator during training of the generator, N is equal to the value of Batch_size in Table 1, and when the trained generator is used to predict and compensate for an actual audio missing segment, N takes the value of 1.

In step S402, the frequency spectrum feature of the audio missing segment is smoothed based on the frequency spectrum feature of the context audio segment to obtain a smoothed frequency spectrum feature.

In step S403, feature compensation can be performed on the frequency spectrum information according to all frequency spectrum features of the context audio segment and the smoothed frequency spectrum feature to obtain compensated frequency spectrum information corresponding to the target audio data.

In step S404, audio prediction can be performed based on the compensated frequency spectrum information to obtain predicted audio data.

In some embodiments, after the frequency spectrum feature of the context audio segment is acquired from the frequency spectrum information of the target audio data, the computer device performs prediction and compensation according to the frequency spectrum feature of the context audio segment. The frequency spectrum information of the target audio data further includes the frequency spectrum feature of the audio missing segment, and the frequency spectrum feature of the audio missing segment is represented as 0 in the frequency domain. Therefore, to avoid a situation where compensated frequency spectrum information that is obtained by subsequently performing feature compensation on the frequency spectrum information of the target audio data based on the frequency spectrum feature of the context audio segment includes many 0, the computer device may first smooth the frequency spectrum feature of the audio missing segment to adjust sampling points originally corresponding to 0 in the frequency spectrum information of the target audio data to non-0 sampling points. Thus, when subsequently performing feature compensation, the computer device will not add many sampling points corresponding to 0 to the frequency spectrum information of the target audio data. The smoothing of the frequency spectrum feature of the audio missing segment may improve the compensation effect of feature compensation subsequently performed on the frequency spectrum information. When smoothing the frequency spectrum feature of the audio missing segment, the computer device will also smooth the frequency spectrum feature of the context audio segment at the same time. In an exemplary implementation, the computer device may perform convolution once on the frequency spectrum information of the target audio data through a cony layer to smooth the frequency spectrum feature of the audio missing segment and the frequency spectrum feature of the context audio segment.

After the frequency spectrum feature of the audio missing segment is smoothed based on the frequency spectrum feature of the context audio segment, the computer device may perform feature compensation on the frequency spectrum information according to the frequency spectrum feature of the context audio segment and the smoothed frequency spectrum feature of the audio missing segment. In an exemplary implementation, the computer device may first acquire a frequency spectrum length of frequency spectrum information composed of the frequency spectrum feature of the context audio segment and the smoothed frequency spectrum feature, and the frequency spectrum length is used for indicating the number of feature points in the frequency spectrum information. For example, the acquired frequency spectrum length of the frequency spectrum information may be 8192. After acquiring the frequency spectrum length, the computer device may determine the number of sampling points in the sampling sequence corresponding to the target audio data according to the sampling rate and the audio extraction length at which the target audio data is obtained, and perform upsampling on the frequency spectrum information according to the number of sampling points, so that the number of feature points in the frequency spectrum information is equal to the number of sampling points. Then, frequency spectrum information subjected to upsampling may be taken as compensated frequency spectrum information corresponding to the target audio data.

Figure 5A:
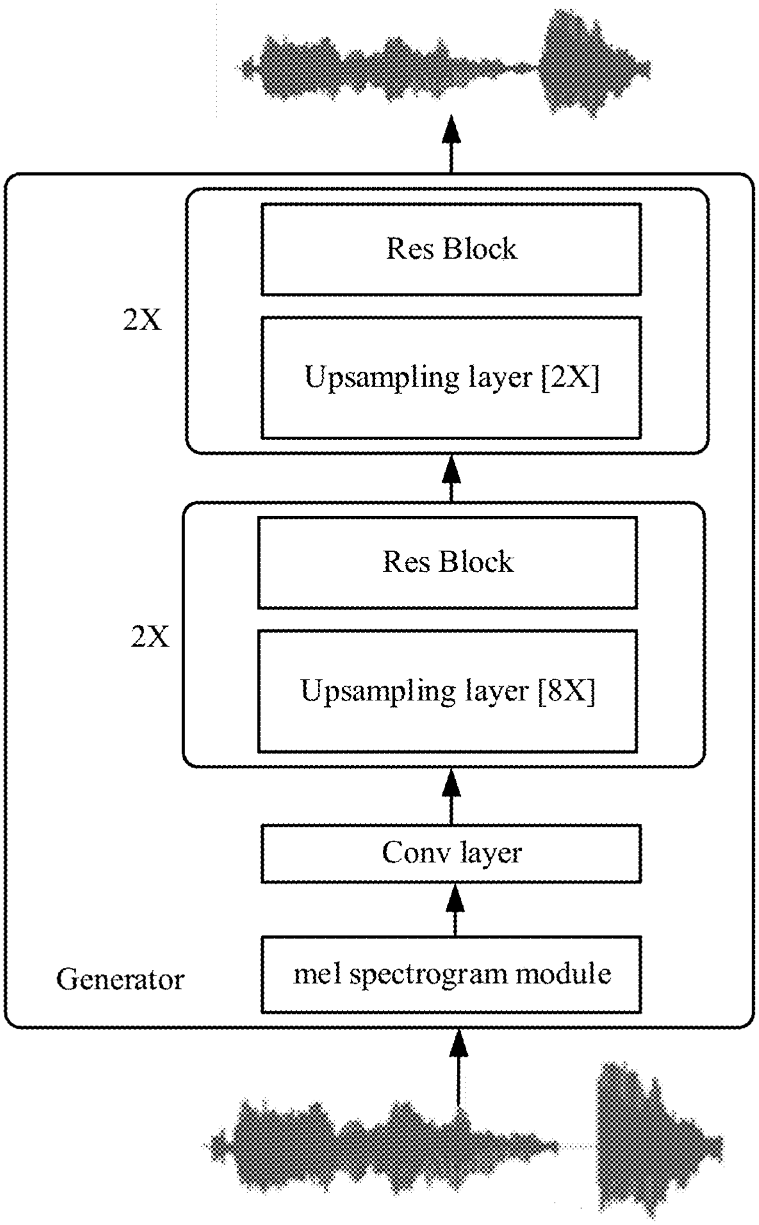
FIG. 5A is a schematic diagram of a generator according to an embodiment of the present disclosure.

A process of generation of the predicted audio data based on the compensated frequency spectrum information after the computer device performs feature compensation on the frequency spectrum information to obtain the compensated frequency spectrum information of the target audio data may be as shown in FIG. 5A. The computer device may first invoke a frequency domain generation module (a mel spectrogram module shown in FIG. 5A) in the generator to map the target audio data to the frequency domain so as to obtain frequency spectrum information of the target audio data, and further perform convolution once through the conv layer to smooth the frequency spectrum feature of the audio missing segment in the frequency spectrum information. In an embodiment, as shown in FIG. 5A, after performing smoothing, the computer device may perform feature compensation on the smoothed frequency spectrum feature by performing 8-fold upsampling twice and 2-fold upsampling twice. In a case that the target audio data acquired by the computer device includes 8192 sampling points, frequency spectrum information of the target audio data that is obtained by the computer device according to the frequency domain mapping parameters in Table 1 may be a 32*80 frequency spectrogram. By performing 8-fold upsampling twice and 2-fold upsampling twice, a length dimension of the frequency spectrogram may be expanded to 32*8*8*2*2=8192.

In addition, the computer device performs upsampling once or more times on the frequency spectrum information according to the number of sampling points, so the computer device may perform multi-scale convolution operation on frequency spectrum information subjected to upsampling once after performing upsampling once to obtain all frequency spectrum features of the context audio segment. When performing multi-scale convolution operation, the computer device may perform deep convolution operation based on a res block structure (a convolution residual network structure) in FIG. 5A. The res block structure includes a plurality of network layers, and is configured to expand a frequency spectrum feature receptive field through multi-layer convolution. For example, the res block structure may include 4 network layers, which are a 3*3 conv layer, a 5*5 conv layer, a 3*3 conv layer, and a 3*3 conv layer, respectively.

After the compensated frequency spectrum information corresponding to the target audio data is obtained, the computer device may compress the number of channels of the compensated frequency spectrum information to obtain predicted audio data. The computer device may adjust the number of frequency spectrum channels of the compensated frequency spectrum information to 1 to obtain predicted audio data. In an embodiment, the compensated frequency spectrum information that is obtained by the computer device by invoking the generator may be [8192, 80], and after acquiring the compensated frequency spectrum information, the computer device may compress the number of channels from 80 to 1 based on the compensated frequency spectrum information to transform the compensated frequency spectrum information into time domain information. It will be appreciated that the time domain information obtained by transforming the compensated frequency spectrum information is predicted audio data obtained by performing audio prediction based on the compensated frequency spectrum information, and the predicted audio data is obtained based on the entire compensated frequency spectrum information and is audio data without an audio missing segment. Thus, the computer device may predict entire audio based on learning of the context of the audio missing segment, and the computer device may compensate for the audio missing segment in the target audio data according to more valid information. Moreover, the computer device performs non-autoregressive end-to-end one-time prediction to obtain predicted audio data, that is, compensates for all packet loss segments of an input once in a case that the input includes a plurality of packet loss segments, so that the computer device may obtain accurate predicted audio data, and meanwhile the calculation time of the computer device may be effectively saved.

In step S405, the audio missing segment in the target audio data can be compensated based on the predicted audio data to obtain compensated audio data of the target audio data.

Figure 5B:
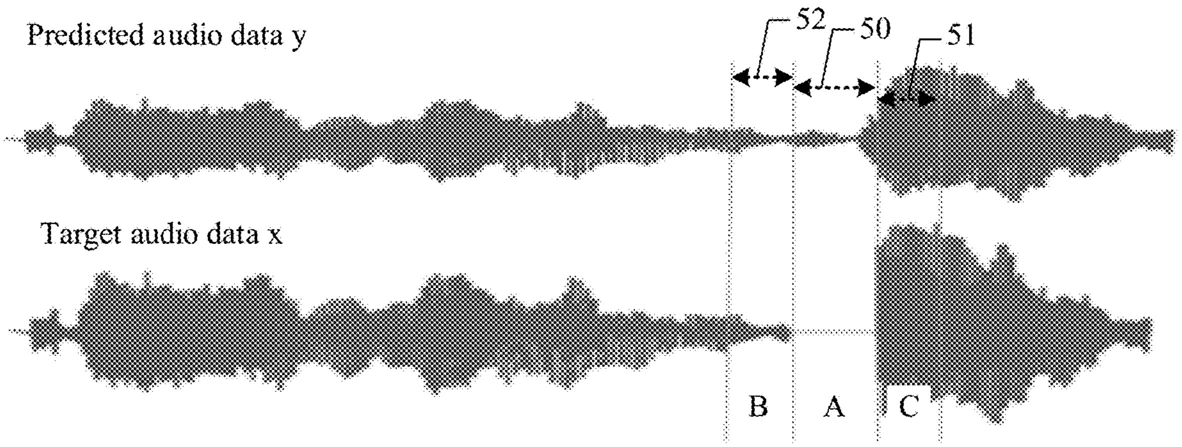
FIG. 5B is a schematic diagram of audio fusion according to an embodiment of the present disclosure.
Figure 5C:
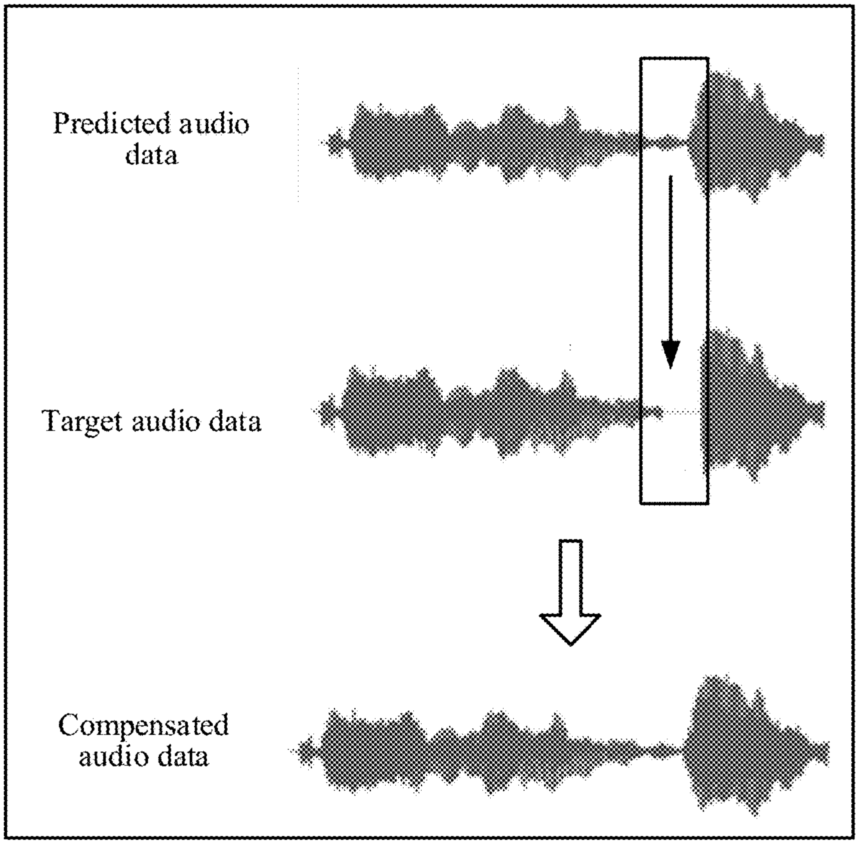
FIG. 5C is a schematic diagram of another audio fusion according to an embodiment of the present disclosure.

After the predicted audio data is obtained, the computer device may compensate for the audio missing segment in the target audio data according to the predicted audio data. In an exemplary implementation, the computer device may perform audio fusion on the target audio data and the predicted audio data based on the audio missing segment to obtain compensated audio data of the target audio data. Because a waveform of the predicted audio data generated by the computer device is not consistent with a waveform of the target audio data, the computer device may perform audio fusion on the target audio data and the predicted audio data based on the audio missing segment in a fade-in and fade-out way, so that the audio missing segment is more smoothly integrated into the original audio, and the original audio is smoothly transited. When performing audio fusion in a fade-in and fade-out way, the computer device may first determine a predicted missing segment corresponding to the audio missing segment from the predicted audio data, and determine an associated predicted segment of the predicted missing segment from the predicted audio data. As shown in FIG. 5B, the predicted missing segment corresponding to the audio missing segment that is determined by the computer device is marked by 50 in FIG. 5B, the associated predicted segment may include audio segments respectively marked by 51 and 52 in FIG. 5B, the audio segment marked by 51 in FIG. 5B may also be referred to as an audio fusion segment after packet loss (postaudio), and the audio segment marked by 52 may also be referred to as an audio fusion segment before packet loss (preaudio). After determining the predicted missing segment and the associated predicted segment, the computer device further determines fusion parameters, and smooths the associated predicted segment according to the fusion parameters to obtain a smoothed associated predicted segment. The fusion parameters can be determined by equation (1).

$$\alpha = \frac{t}{N}, \beta = 1 - \frac{t}{N} \quad \text{Eq. (1)}$$

where, t represents the time corresponding to a sampling point, N represents the total number of sampling points included in a segment where the sampling point is located, and calculated fusion parameters include α and β in the foregoing formula. After obtaining the fusion parameters, the computer device may smooth the associated predicted segment based on the fusion parameters in combination with the predicted audio data (of which a corresponding sequence is assumed to be y) and the target audio data (of which a corresponding sequence is assumed to be x), and a smoothed associated predicted segment can be shown in equation (2) and equation (3).

$$\text{preaudio} = \alpha * y + \beta * x \quad \text{Eq. (2)}$$

$$\text{postaudio} = \alpha * x + \beta * y \quad \text{Eq. (3)}$$

where, preaudio represents a packet loss preceding text (or an audio fusion segment before packet loss), and postaudio represents a packet loss succeeding text (or an audio fusion segment after packet loss). In the predicted audio data, the computer device may further replace a corresponding audio segment in the predicted audio data with the smoothed associated predicted segment to obtain fused audio data, or in the target audio data, the computer device may replace the corresponding audio segment in the predicted audio data with the smoothed associated predicted segment, and replace the audio missing segment with the predicted missing segment to obtain fused audio data. By fusing the context segment in the predicted audio data based on the audio missing segment, the generated audio missing segment may be smoothly transited in the compensated audio data, thereby improving the quality of the audio. A process of fusing the target audio data and the predicted audio data to finally obtain compensated audio data by the computer device may be as shown in FIG. 5C.

In an embodiment, in a case that the target audio data is data extracted by the generator from training audio data, when training the generator, the computer device may invoke the discriminator to recognize compensated audio data generated by the generator after the computer device invokes the generator to obtain the compensated audio data, and continuously optimize the generator through adversarial training between the discriminator and the generator, so that a difference between the compensated audio data generated by the generator and the original audio data is continuously reduced. The discriminator is a classification network, and is mainly configured to determine whether the generated compensated audio data is the original audio data. The adversarial learning process of the discriminator and the generator makes the discriminator unable to distinguish the difference between the compensated audio data learned and generated by the generator and the original audio data, thereby improving the quality of the audio data generated by the generator. The original audio data may be audio data without an audio missing segment that is acquired by the computer device from training sample data.

Figure 5D:
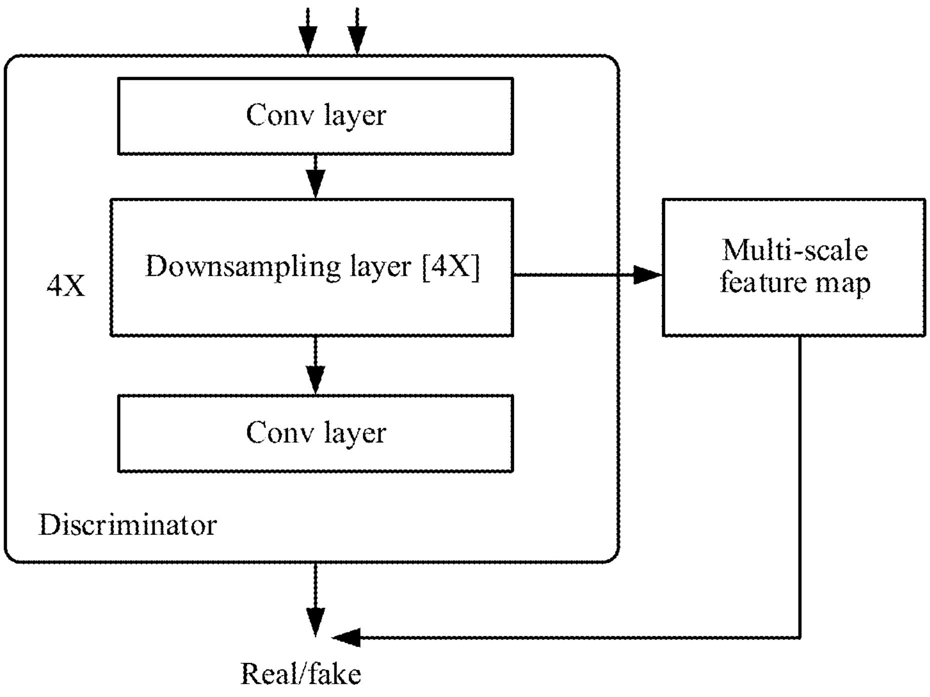
FIG. 5D is a schematic diagram of a discriminator according to an embodiment of the present disclosure.

The discriminator can be as shown in FIG. 5D. The discriminator mainly adopts convolution operation and downsampling operation to extract feature maps corresponding to different resolutions from the compensated audio data, and the feature maps are used for subsequently solving a loss function. That is, after invoking the discriminator to extract feature maps corresponding to different resolutions from the compensated audio data, the computer device may determine, according to the feature maps corresponding to the compensated audio data at different resolutions, a feature difference between the compensated audio data and the intermediate audio data from which the target audio data is obtained, and train the generator and the discriminator to obtain trained generator and discriminator. The loss function used for training the generator and the discriminator includes one or more of the following: a discriminator loss function, a generator loss function, and a multi-resolution loss function (that is, a stft loss function). In an embodiment, the discriminator loss function and the generator loss function are loss functions used for time domain analysis of audio data, and the multi-resolution loss function is a loss function used for frequency domain analysis of audio data.

In an embodiment, when the generator and the discriminator are trained according to the feature maps at different resolutions, the computer device may first determine a time domain feature of the compensated audio data according to the feature maps corresponding to the compensated audio data at different resolutions. After acquiring a time domain feature difference between the compensated audio data and the intermediate audio data from which the target audio data is obtained, the computer device may acquire a consistency discrimination result of the compensated audio data and the intermediate audio data that is determined by the discriminator based on the time domain feature difference. The computer device may determine the discriminator loss function according to the consistency discrimination result, then determine the generator loss function according to the time domain feature difference, and train the generator and the discriminator according to the generator loss function and the discriminator loss function. A process of training the generator and the discriminator according to the generator loss function and the discriminator loss function may be that the generator is trained according to the generator loss function, and the discriminator is trained according to the discriminator loss function, or may also be that the generator and the discriminator are trained together according to a combined loss function composed of the generator loss function and the discriminator loss function. If x is original audio data (or real audio data, that is, may be the foregoing intermediate audio data), s is audio data (such as the foregoing target audio data) that has a lost packet and is inputted into the generator, and z is random noise, the discriminator loss function can be represented as equation (4) and equation (5).

$$\text{Loss}_D = \min_{D_k} E_x[\min(0, 1 - D_k(x))] + E_{s,z}[\min(0, 1 + D_k(G(s,z)))] \quad \text{Eq. (4)}$$

$$\text{Loss}_D = \min_{D_k} E_x[\min(0, 1 - D_k(x))] + E_{s,z}[\min(0, 1 + D_k(G(s,z)))] + \min_G E_{s,z}[-D_k(G(s,z))] \quad \text{Eq. (5)}$$

where, G(s,z) refers to an expression corresponding to audio data (such as the foregoing compensated audio data) generated by the generator, $D_k(x)$ refers to feature maps at different resolutions that are obtained by the discriminator by sampling original audio data, and $D_k(G(s,z))$ refers to feature maps at different resolutions that are obtained by the discriminator by sampling the audio data generated by the generator.

It is expected that the audio data generated by the generator is as similar as possible to the original audio data. Therefore, higher weights may be assigned to a mask segment (such as the foregoing audio missing segment) to verify the ability of the generator to generate the missing segment. If a ticket corresponding to the audio missing segment is w, the generator loss function can be represented as equation (6).

$$Loss_G=L1(x,G(s,z))+w(x_{mask},G(s,z)_{mask}) \quad \text{Eq. (6)}$$

In an embodiment, both the foregoing discriminator loss function $Loss_D$ and the generator loss function $Loss_G$ are loss functions used for time domain analysis of audio data. In addition, multi-frequency band information of audio is taken into account, so that audio generated by the generator has a better effect on each frequency band. During training, a resolution (STFT) loss function may also be taken in account to improve the stability of audio generated by the generator. The multi-resolution loss function refers to accumulation of audio in different parameters (such as an FFT length, a frame shift length, and a window size). Thus, the computer device may determine a frequency spectrum feature of the feature map of the compensated audio data at any resolution, and acquire a frequency spectrum feature of the intermediate audio data (that is, the original audio data) of the target audio data. Then, the computer device may obtain a spectrum convergence function associated with the feature map at any resolution according to the frequency spectrum feature of the feature map at any resolution and the frequency spectrum feature of the intermediate audio data. In an embodiment, if x is original audio data, y is reconstructed audio data (such as the foregoing compensated audio data or predicted audio data), and $L_{sc}$ represents a spectrum convergence, the foregoing spectrum convergence function can be represented as equation (7).

$$L_{sc}(x,y)=\frac{\||STFT(x)|-|STFT(y)|\|}{|STFT(x)|} \quad \text{Eq. (7)}$$

After the spectrum convergence function associated with the feature map at any resolution is obtained, the computer device may solve the multi-resolution loss function according to the spectrum convergence function associated with the feature maps at the resolutions, and train the generator and the discriminator based on the multi-resolution loss function. In an exemplary implementation, when obtaining the spectrum convergence function associated with the feature map at any resolution according to the frequency spectrum feature of the feature map at any resolution and the frequency spectrum feature of the intermediate audio data, the computer device may determine, in a case that the frequency spectrum feature of the intermediate audio data is taken as a reference feature, a spectrum convergence function corresponding to the feature map at any resolution according to the frequency spectrum feature of the feature map at any resolution and the frequency spectrum feature of the intermediate audio data. The spectrum convergence function is used for indicating a frequency spectrum difference between the frequency spectrum feature of the intermediate audio data and the feature map at any resolution. Thus, when solving the multi-resolution loss function according to the spectrum convergence function associated with the feature maps at the resolutions, the computer device may first acquire a frequency spectrum magnitude difference between the frequency spectrum feature of the feature map at any resolution and the frequency spectrum feature of the intermediate audio data to obtain a magnitude difference function. As described above, if x is original audio data, y is reconstructed audio data (such as the foregoing compensated audio data or predicted audio data), and $L_{mag}$ represents a resolution loss logarithm, the foregoing magnitude difference function may be represented as equation (8).

$$L_{mag}(x,y)=\frac{\|\log|STFT(x)|-\log|STFT(y)|\|}{N} \quad \text{Eq. (8)}$$

After the spectrum convergence function and the magnitude difference function are obtained, the computer device may take a function obtained by weighting the spectrum convergence function associated with the feature maps at the resolutions and the corresponding magnitude difference function as a multi-resolution loss function. The weighting of the spectrum convergence function associated with any feature map and the magnitude difference function can be represented as equation (9).

$$L_s(G)=L_{sc}(x,y)+L_{mag}(x,y) \quad \text{Eq. (9)}$$

The computer device may further perform normalization based on the weighting expression of the spectrum convergence function associated with the feature maps and the magnitude difference function to obtain a multi-resolution loss function. The multi-resolution loss function can be represented by $L_{aux}(G)$, such as represented by equation (10).

$$L_{aux}(G)=\frac{1}{M}\sum_{m=1}^{M}L_s^{(m)}(G) \quad \text{Eq. (10)}$$

where, m represents a value of the number of obtained feature maps at different resolutions, M represents the total number of obtained feature maps at different resolutions, m may take the value of 0 to 3, and M is equal to 4. Based on the foregoing loss functions, the loss function used for training the generator is represented as equation (11).

$$Loss=Loss_G+Loss_D+L_{aux}(G) \quad \text{Eq. (11)}$$

Figure 5E:
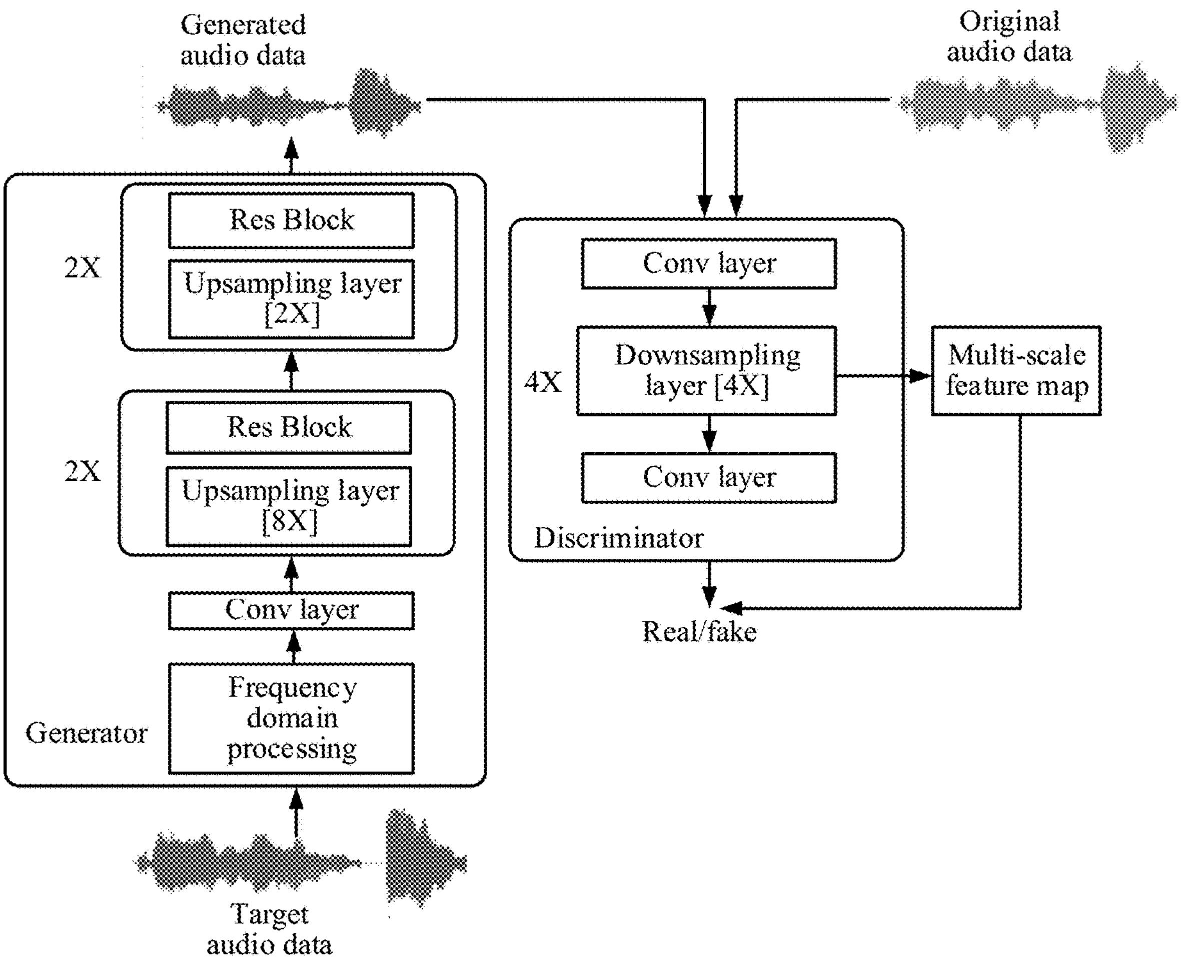
FIG. 5E is a schematic diagram of a generator and a discriminator according to an embodiment of the present disclosure.

The generator is trained according to a combined loss of the time domain and the frequency domain, so that a trained generator generates high-level semantics and audio data with high audio quality. In an embodiment, a connection mode of the generator and the discriminator may be as shown in FIG. 5E. Audio data generated by the generator may be the foregoing predicted audio data, or may also be the foregoing compensated audio data, which is not defined herein.

In the embodiments of this disclosure, in order to enable a computer device to refer to more audio information in target audio data when the computer device predicts and compensates for an audio missing segment in the target audio data, the computer device may predict and compensate for the audio missing segment based on an end-to-end non-autoregressive generator according to all frequency spectrum information of context audio data of the audio missing segment in the target audio data. Moreover, after obtaining predicted audio data, the computer device generates final compensated predicted data based on the predicted audio data and the target audio data, so that the accuracy of prediction performed by the computer device on the audio missing segment is improved, the smooth transition performed by the computer device on the audio missing segment according to the predicted data is also improved, and the listening experience of a user may be improved. In addition, when training the generator, the computer device trains the time domain prediction performance and the frequency domain prediction performance of the generator respectively, so that the robustness of a trained generator may be improved.

Figure 6:
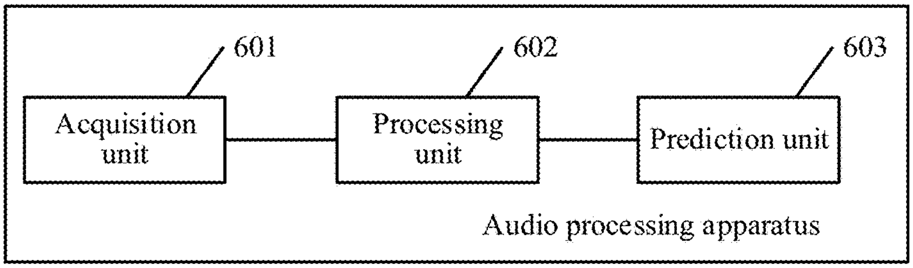
FIG. 6 is a schematic block diagram of an audio processing apparatus according to an embodiment of the present disclosure.

Based on the description of the foregoing audio processing method embodiments, the embodiments of the present disclosure further propose an audio processing apparatus, which may be a computer program (including program codes) running on the foregoing computer device. The audio processing apparatus is configured to perform the audio processing method shown in FIG. 2 or FIG. 4. Referring to FIG. 6, the audio processing apparatus includes an acquisition unit 601, a processing unit 602, and a prediction unit 603.

The acquisition unit 601 is configured to acquire to-be-processed target audio data and frequency spectrum information of the target audio data, the target audio data having an audio missing segment, and the frequency spectrum information including a frequency spectrum feature of a context audio segment of the audio missing segment.

The processing unit 602 is configured to perform feature compensation on the frequency spectrum information of the target audio data according to the frequency spectrum feature of the context audio segment to obtain compensated frequency spectrum information corresponding to the target audio data.

The prediction unit 603 is configured to perform audio prediction according to the compensated frequency spectrum information to obtain predicted audio data.

The processing unit 602 is further configured to compensate for the audio missing segment in the target audio data according to the predicted audio data to obtain compensated audio data of the target audio data.

In an embodiment, the processing unit 602 is configured to perform audio fusion on the target audio data and the predicted audio data based on the audio missing segment to obtain compensated audio data of the target audio data.

In an embodiment, the processing unit 602 is configured to determine a predicted missing segment corresponding to the audio missing segment from the predicted audio data, and determine an associated predicted segment of the predicted missing segment from the predicted audio data. The processing unit 602 can also be configured to acquire fusion parameters, and smooth the associated predicted segment according to the fusion parameters to obtain a smoothed associated predicted segment. The processing unit 602 can be configured to replace, in the predicted audio data, a corresponding audio segment in the predicted audio data with the smoothed associated predicted segment to obtain fused audio data.

In an embodiment, the processing unit 602 is configured to replace the audio missing segment in the target audio data with the predicted missing segment in the predicted audio data, and replace a corresponding audio segment in the target audio data with the smoothed associated predicted segment to obtain fused audio data.

In an embodiment, the target audio data includes data extracted by a generator from training audio data, and the generator specifies a sampling rate and an audio extraction length. The acquisition unit 601 is configured to invoke the generator to extract intermediate audio data with a length equal to the audio extraction length from the training audio data according to the audio extraction length. The acquisition unit 601 is configured to invoke the generator to sample the intermediate audio data according to a target sampling rate to obtain a sampling sequence of the intermediate audio data, and perform simulative packet loss adjustment on a plurality of sampling points in the sampling sequence according to a preset packet loss length to obtain target audio data, the sampling points subjected to simulative packet loss adjustment being an audio missing segment in the target audio data.

In an embodiment, the target audio data is determined by the generator according to the intermediate audio data extracted from the training audio data; and the processing unit 602 is further configured to invoke a discriminator to extract feature maps corresponding to different resolutions from the compensated audio data.

The processing unit 602 is further configured to determine a feature difference between the compensated audio data and the intermediate audio data from which the target audio data is obtained according to the feature maps corresponding to the compensated audio data at different resolutions, and train the generator and the discriminator based on the feature difference to obtain trained generator and discriminator.

In an embodiment, the generator and the discriminator are trained based on a loss function, and the loss function includes a multi-resolution loss function. The processing unit 602 is configured to determine a frequency spectrum feature of the feature map of the compensated audio data at any resolution, and acquire a frequency spectrum feature of the intermediate audio data. The processing unit 602 is configured to obtain a spectrum convergence function associated with the feature map at any resolution according to the frequency spectrum feature of the feature map at any resolution and the frequency spectrum feature of the intermediate audio data. The spectrum convergence function can indicate a frequency spectrum difference between the frequency spectrum feature of the intermediate audio data and the feature map at any resolution. The processing unit 602 is configured to solve the multi-resolution loss function according to the spectrum convergence function associated with the feature maps at the resolutions, and train the generator and the discriminator based on the multi-resolution loss function.

In an embodiment, the processing unit 602 is configured to determine, in a case that the frequency spectrum feature of the intermediate audio data is taken as a reference feature, a spectrum convergence function corresponding to the feature map at any resolution according to the frequency spectrum feature of the feature map at any resolution and the frequency spectrum feature of the intermediate audio data.

The processing unit 602 is configured to acquire a frequency spectrum magnitude difference between the frequency spectrum feature of the feature map at any resolution and the frequency spectrum feature of the intermediate audio data to obtain a magnitude difference function. The processing unit 602 is also configure to take a function obtained by weighting the spectrum convergence function associated with the feature maps at the resolutions and the corresponding magnitude difference function as a multi-resolution loss function.

In an embodiment, the generator and the discriminator are trained based on the loss function. The loss function further includes a discriminator loss function and a generator loss function. The processing unit 602 is configured to determine a time domain feature of the compensated audio data according to the feature maps corresponding to the compensated audio data at different resolutions, and acquire a time domain feature difference between the compensated audio data and the intermediate audio data from which the target audio data is obtained. The processing unit 602 is configured to acquire a consistency discrimination result of the compensated audio data and the intermediate audio data that is determined by the discriminator based on the time domain feature difference, and solve the discriminator loss function according to the consistency discrimination result. The processing unit 602 is configured to solve the generator loss function according to the time domain feature difference, and train the generator and the discriminator according to the generator loss function and the discriminator loss function.

In an embodiment, the frequency spectrum information further includes a frequency spectrum feature of the audio missing segment. The processing unit 602 is configured to smooth the frequency spectrum feature of the audio missing segment according to the frequency spectrum feature of the context audio segment to obtain a smoothed frequency spectrum feature. The processing unit 602 is configured to perform feature compensation on the frequency spectrum information according to all frequency spectrum features of the context audio segment and the smoothed frequency spectrum feature to obtain compensated frequency spectrum information corresponding to the target audio data.

In an embodiment, the processing unit 602 is configured to acquire a frequency spectrum length of frequency spectrum information composed of the frequency spectrum feature of the context audio segment and the smoothed frequency spectrum feature, where the frequency spectrum length can indicate the number of feature points in the frequency spectrum information. The processing unit 602 is configured to determine the number of sampling points in the sampling sequence corresponding to the target audio data according to the sampling rate and the audio extraction length at which the target audio data is obtained, and perform upsampling on the frequency spectrum information according to the number of sampling points, so that the number of feature points in the frequency spectrum information is equal to the number of sampling points. The processing unit 602 is further configured to take frequency spectrum information subjected to upsampling as compensated frequency spectrum information corresponding to the target audio data.

In an embodiment, upsampling is performed once or more times on the frequency spectrum information according to the number of sampling points; and the processing unit 602 is further configured to perform multi-scale convolution operation on frequency spectrum information subjected to upsampling once after upsampling is performed once to obtain all frequency spectrum features of the context audio segment.

In an embodiment, the prediction unit 603 is configured to adjust the number of frequency spectrum channels of the compensated frequency spectrum information to 1 to obtain predicted audio data.

In the embodiments of this disclosure, the acquisition unit 601 may acquire frequency spectrum information of target audio data after acquiring the target audio data with an audio missing segment, and the processing unit 602 may perform feature compensation on the frequency spectrum information based on a frequency spectrum feature of a context audio segment of the audio missing segment that is included in the frequency spectrum information to obtain compensated frequency spectrum information of the target audio data, and recognize the compensated frequency spectrum information to obtain more frequency spectrum information of the target audio data. In addition, after the processing unit 602 obtains the compensated frequency spectrum information, the prediction unit 603 may perform audio prediction according to the compensated frequency spectrum information to obtain predicted audio data, and compensate for the audio missing segment in the target audio data according to the predicted audio data and the target audio data to obtain compensated audio data of the target audio data. The audio missing segment is predicted and compensated according to frequency spectrum information of the overall context audio segment, so that the audio missing segment is predicted and compensated based on all frequency spectrum information of the target audio data, and the accuracy and rationality of prediction and compensation for the audio missing segment may be improved.

Figure 7:
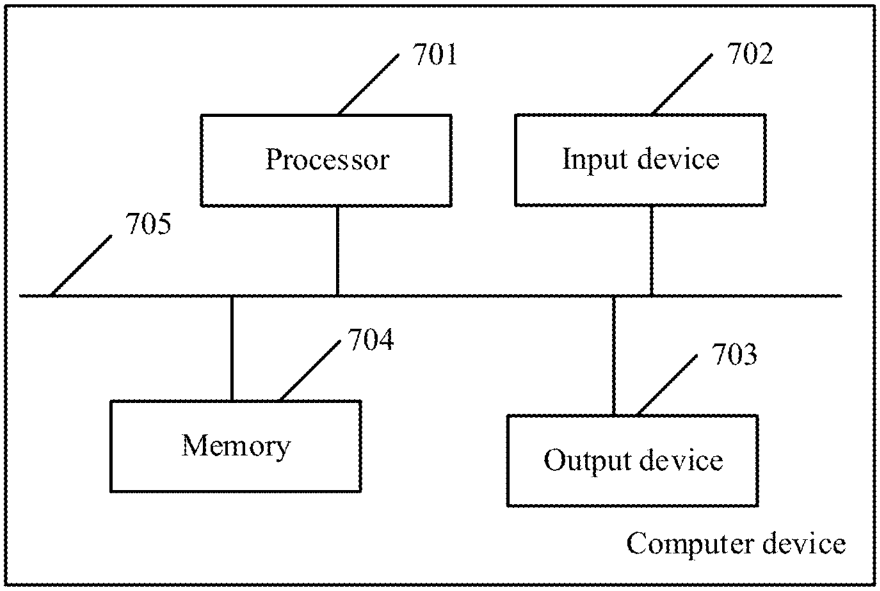
FIG. 7 is a schematic block diagram of a computer device according to an embodiment of the present disclosure.

Referring to FIG. 7, FIG. 7 is a schematic structural block diagram of a computer device according to an embodiment of the present disclosure. The computer device may be a terminal device or a server, which is not defined herein. As shown in FIG. 7, the computer device of this embodiment may include one or more processors 701 (processing circuitry), one or more input devices 702, one or more output devices 703, and a memory 704 (non-transitory computer-readable storage medium). The foregoing processor 701, input device 702, output device 703, and memory 704 are connected via a bus 705. The memory 704 is configured to store a computer program including program instructions, and the processor 701 is configured to execute the program instructions stored in the memory 704.

The memory 704 may include a volatile memory such as a random-access memory (RAM). The memory 704 may also include a non-volatile memory such as a flash memory and a solid-state drive (SSD). The memory 704 may further include a combination of the foregoing types of memories.

The processor 701 may be a central processing unit (CPU). The processor 701 may further include a hardware chip. The foregoing hardware chip may be an application-specific integrated circuit (ASIC), a programmable logic device (PLD), or the like. The PLD may be a field-programmable gate array (FPGA), a generic array logic (GAL), or the like. The processor 701 may also be a combination of the foregoing structures.

In the embodiments of the present disclosure, the memory 704 is configured to store a computer program including program instructions, and the processor 701 is configured to execute the program instructions stored in the memory 704 to implement the steps of the corresponding method shown in FIG. 2 or FIG. 4.

In an embodiment, based on the program instructions, the processor 701 is configured to acquire to-be-processed target audio data and frequency spectrum information of the target audio data, where the target audio data includes an audio missing segment, and the frequency spectrum information includes a frequency spectrum feature of a context audio segment of the audio missing segment. The processor 701 is confiture to perform feature compensation on the frequency spectrum information of the target audio data according to the frequency spectrum feature of the context audio segment to obtain compensated frequency spectrum information corresponding to the target audio data. The processor 701 is configured to perform audio prediction according to the compensated frequency spectrum information to obtain predicted audio data. The processor 701 is further configured to compensate the audio missing segment in the target audio data according to the predicted audio data to obtain compensated audio data of the target audio data.

The embodiments of the present disclosure provide a computer program product or a computer program, which includes computer instructions. The computer instructions are stored in a computer-readable storage medium. A processor of a computer device reads the computer instructions from the computer-readable storage medium and executes the computer instructions to cause the computer device to perform the foregoing method embodiment shown in FIG. 2 or FIG. 4. The computer-readable storage medium may be a magnetic disk, an optical disc, a read-only memory (ROM), a random access memory (RAM), or the like.

In addition, the embodiments of this disclosure further provide a storage medium, which is configured to store a computer program. The computer program is used for performing the method according to the foregoing embodiments.

The above are merely some embodiments of the present disclosure, and are not intended to limit the scope of the claims of the present disclosure. Those of ordinary skill in the art may understand and implement all or some processes of the foregoing embodiments, and equivalent modifications made according to the claims of the present disclosure shall still fall within the scope of the present disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

What is claimed is:

1. An audio processing method, comprising:

acquiring target audio data and frequency spectrum information of the target audio data, the target audio data corresponding to a time interval in a time domain and including an audio missing segment, context audio segments, and other valid audio segments, the context audio segments including a first valid audio segment preceding the audio missing segment and a second valid audio segment succeeding the audio missing segment, and the frequency spectrum information including frequency spectrum features of the target audio data corresponding to the time interval irrespective of a position of the audio missing segment within the target audio data;

performing feature compensation on the frequency spectrum information of the target audio data based on the frequency spectrum features of the target audio data to obtain compensated frequency spectrum information corresponding to the target audio data, the compensated frequency spectrum information indicating upsampled frequency spectrum information associated with the target audio data and including additional feature information that is not included in the frequency spectrum information;

generating predicted audio data corresponding to the time interval in the time domain based on the compensated frequency spectrum information; and obtaining compensated audio data based on modification of a portion of the target audio data according to a corresponding portion of the predicted audio data, the portion of the target audio data corresponding to the audio missing segment and at least a subset of the context audio segments.

2. The method according to claim 1, wherein the obtaining the compensated audio data comprises:

replacing the audio missing segment in the predicted audio data with a predicted segment in the predicted audio data corresponding to the audio missing segment in the predicted audio data.

3. The method according to claim 2, wherein the obtaining the compensated audio data comprises:

acquiring one or more fusion parameters;

smoothing one or more associated predicted segments in the predicted audio data that correspond to the subset of the context audio segments based on the one or more fusion parameters to obtain one or more smoothed associated predicted segments; and replacing the subset of the context audio segments with the one or more smoothed associated predicted segments.

4. The method according to claim 1, wherein:

the target audio data is extracted by a generator from training audio data, the generator is configured to specify a sampling rate and an audio extraction length, and the acquiring the target audio data includes:

based on the generator, extracting intermediate audio data with a length equal to the audio extraction length from the training audio data;

sampling the intermediate audio data according to the sampling rate to obtain a sampling sequence of the intermediate audio data; and performing a simulative packet loss adjustment on a plurality of sampling points in the sampling sequence according to a preset packet loss length to obtain the target audio data such that audio data of the plurality of sampling points is zero, the plurality of sampling points subjected to the simulative packet loss adjustment being set as the audio missing segment in the target audio data.

5. The method according to claim 4, the method further comprises:

extracting feature maps at a plurality of resolutions from the compensated audio data based on a discriminator;

determining a feature difference between the compensated audio data and the intermediate audio data according to the feature maps at the plurality of resolutions; and training the generator and the discriminator based on the feature difference to obtain a trained generator and a trained discriminator.

6. The method according to claim 5, wherein:

the generator and the discriminator are trained based on a loss function, the loss function includes a multi-resolution loss function, and the method further includes:

determining a frequency spectrum feature of each of the feature maps of the compensated audio data at a respective resolution;

acquiring a frequency spectrum feature of the intermediate audio data;

obtaining a spectrum convergence function associated with each of the feature maps at a respective resolution based on the frequency spectrum feature of the corresponding one of the feature maps at the respective resolution and the frequency spectrum feature of the intermediate audio data, the spectrum convergence function indicating a frequency spectrum difference between the frequency spectrum feature of the intermediate audio data and the corresponding one of the feature maps at the respective resolution;

solving the multi-resolution loss function based on the spectrum convergence functions associated with the feature maps at the plurality of resolutions; and training the generator and the discriminator based on the multi-resolution loss function.

7. The method according to claim 6, wherein:

the obtaining the spectrum convergence function includes:

determining, based on the frequency spectrum feature of the intermediate audio data being a reference feature, the spectrum convergence function of each of the feature maps at the respective resolution according to the corresponding one of the frequency spectrum features of the feature maps at the respective resolution and the frequency spectrum feature of the intermediate audio data, and the solving the multi-resolution loss function includes:

acquiring a frequency spectrum magnitude difference between each of the frequency spectrum features of the feature maps at the respective resolution and the frequency spectrum feature of the intermediate audio data to obtain a magnitude difference function; and determining the multi-resolution loss function by weighting the spectrum convergence functions associated with the feature maps at the plurality of resolutions and the magnitude difference functions corresponding to the feature maps.

8. The method according to claim 5, wherein:

the generator and the discriminator are trained based on a loss function, the loss function further includes a discriminator loss function and a generator loss function, and the method further comprises:

determining a time domain feature of the compensated audio data according to the feature maps of the compensated audio data at the plurality of resolutions;

acquiring a time domain feature difference between the compensated audio data and the intermediate audio data from which the target audio data is obtained;

acquiring a consistency discrimination result that indicates whether the compensated audio data and the intermediate audio data are consistent by the discriminator based on the time domain feature difference;

solving the discriminator loss function according to the consistency discrimination result;

solving the generator loss function based on the time domain feature difference; and training the generator and the discriminator based on the generator loss function and the discriminator loss function.

9. The method according to claim 4, wherein:

the frequency spectrum information of the target audio data further includes a frequency spectrum feature of the audio missing segment, and the performing the feature compensation includes:

smoothing the frequency spectrum feature of the audio missing segment based on the frequency spectrum features of the context audio segments to obtain a smoothed frequency spectrum feature; and obtaining the compensated frequency spectrum information corresponding to the target audio data based on the frequency spectrum features of the context audio segments and the smoothed frequency spectrum feature of the audio missing segment.

10. The method according to claim 9, wherein the performing the feature compensation further comprises:

acquiring a frequency spectrum length of the frequency spectrum information that includes the frequency spectrum features of the context audio segments and the smoothed frequency spectrum feature of the audio missing segment, the frequency spectrum length indicating a number of feature points in the frequency spectrum information;

determining a number of sampling points in the sampling sequence corresponding to the target audio data based on the sampling rate and the audio extraction length;

upsampling the frequency spectrum information according to the number of the sampling points in the sampling sequence such that the number of feature points in the frequency spectrum information is equal to the number of sampling points in the sampling sequence; and setting the upsampled frequency spectrum information as the compensated frequency spectrum information corresponding to the target audio data.

11. The method according to claim 10, wherein:

the upsampling is performed one or more times on the frequency spectrum information according to the number of sampling points, and the method further includes:

performing multi-scale convolution operation on the upsampled frequency spectrum information to obtain the frequency spectrum features of the context audio segments.

12. The method according to claim 1, wherein the generating the predicted audio data comprises:

adjusting a number of frequency spectrum channels of the compensated frequency spectrum information to 1; and using the adjusted compensated frequency spectrum information to generate the predicted audio data.

13. An apparatus for audio processing, the apparatus comprising:

processing circuitry configured to:

acquire target audio data and frequency spectrum information of the target audio data, the target audio data corresponding to a time interval in a time domain and including an audio missing segment, context audio segments, and other valid audio segments, the context audio segments including a first valid audio segment preceding the audio missing segment and a second valid audio segment succeeding the audio missing segment, and the frequency spectrum information including frequency spectrum features of the target audio data corresponding to the time interval irrespective of a position of the audio missing segment within the target audio data;

perform feature compensation on the frequency spectrum information of the target audio data based on the frequency spectrum features of the target audio data to obtain compensated frequency spectrum information corresponding to the target audio data, the compensated frequency spectrum information indicating upsampled frequency spectrum information associated with the target audio data and including additional feature information that is not included in the frequency spectrum information;

generate predicted audio data corresponding to the time interval in the time domain based on the compensated frequency spectrum information; and obtain compensated audio data based on modification of a portion of the target audio data according to a corresponding portion of the predicted audio data, the portion of the target audio data corresponding to the audio missing segment and at least a subset of the context audio segments.

14. The apparatus according to claim 13, wherein the processing circuitry is configured to:

replace the audio missing segment in the predicted audio data with a predicted segment in the predicted audio data corresponding to the audio missing segment in the predicted audio data.

15. The apparatus according to claim 14, wherein the processing circuitry is configured to:

acquire one or more fusion parameters;

smooth one or more associated predicted segments in the predicted audio data that correspond to the subset of the context audio segments based on the one or more fusion parameters to obtain one or more smoothed associated predicted segments; and replace the subset of the context audio segments with the one or more smoothed associated predicted segments.

16. The apparatus according to claim 13, wherein:

the target audio data is extracted by a generator from training audio data, the generator is configured to specify a sampling rate and an audio extraction length, and the processing circuitry is configured to:

based on the generator, extract intermediate audio data with a length equal to the audio extraction length from the training audio data;

sample the intermediate audio data according to the sampling rate to obtain a sampling sequence of the intermediate audio data; and perform a simulative packet loss adjustment on a plurality of sampling points in the sampling sequence according to a preset packet loss length to obtain the target audio data such that audio data of the plurality of sampling points is zero, the plurality of sampling points subjected to the simulative packet loss adjustment being set as the audio missing segment in the target audio data.

17. The apparatus according to claim 16, wherein the processing circuitry is configured to:

extract feature maps at a plurality of resolutions from the compensated audio data based on a discriminator;

determine a feature difference between the compensated audio data and the intermediate audio data according to the feature maps at the plurality of resolutions; and train the generator and the discriminator based on the feature difference to obtain a trained generator and a trained discriminator.

18. A non-transitory computer readable storage medium storing instructions which when executed by at least one processor cause the at least one processor to perform:

acquiring target audio data and frequency spectrum information of the target audio data, the target audio data corresponding to a time interval in a time domain and including an audio missing segment, context audio segments, and other valid audio segments, the context audio segments including a first valid audio segment preceding the audio missing segment and a second valid audio segment succeeding the audio missing segment, and the frequency spectrum information including frequency spectrum features of the target audio data corresponding to the time interval irrespective of a position of the audio missing segment within the target audio data;

performing feature compensation on the frequency spectrum information of the target audio data based on the frequency spectrum features of the target audio data to obtain compensated frequency spectrum information corresponding to the target audio data, the compensated frequency spectrum information indicating upsampled frequency spectrum information associated with the target audio data and including additional feature information that is not included in the frequency spectrum information;

generating predicted audio data corresponding to the time interval in the time domain based on the compensated frequency spectrum information; and obtaining compensated audio data based on modification of a portion of the target audio data according to a corresponding portion of the predicted audio data, the portion of the target audio data corresponding to the audio missing segment and at least a subset of the context audio segments.

19. The non-transitory computer readable storage medium according to claim 18, wherein the obtaining the compensated audio data comprises:

replacing the audio missing segment in the predicted audio data with a predicted segment in the predicted audio data corresponding to the audio missing segment in the predicted audio data.

20. The non-transitory computer readable storage medium according to claim 19, wherein the obtaining the compensated audio data comprises:

acquiring one or more fusion parameters;

smoothing one or more associated predicted segments in the predicted audio data that correspond to the subset of the context audio segments based on the one or more fusion parameters to obtain one or more smoothed associated predicted segments; and replacing the subset of the context audio segments with the one or more smoothed associated predicted segments.

* * * * *